United States Patent [19]

Williams

[11] 4,293,876
[45] Oct. 6, 1981

[54] TELEVISION MONITORING SYSTEM

[76] Inventor: Jarvis L. Williams, 901 Satterlee, Bloomfield Hills, Mich. 48013

[21] Appl. No.: 111,300

[22] Filed: Jan. 11, 1980

[51] Int. Cl.³ .............................................. H04N 7/18
[52] U.S. Cl. .................................... 358/211; 358/108; 358/210
[58] Field of Search ............... 358/211, 225, 226, 229, 358/108, 210, 194.1

[56] References Cited

U.S. PATENT DOCUMENTS

| | | | |
|---|---|---|---|
| 2,978,538 | 4/1961 | Breese | 358/210 |
| 3,399,614 | 9/1968 | Fischer | 358/210 |
| 3,634,622 | 1/1972 | Wheeler | 358/229 |
| 3,798,368 | 3/1974 | Kardach | 358/108 |
| 3,889,052 | 6/1975 | Back | 358/108 |
| 3,891,795 | 6/1975 | Johnson | 358/108 |

FOREIGN PATENT DOCUMENTS

1134884  8/1962  Fed. Rep. of Germany ...... 358/210

*Primary Examiner*—Howard Britton
*Attorney, Agent, or Firm*—Harness, Dickey & Pierce

[57] ABSTRACT

A remote controlled television monitoring system for both day and low light level condition monitoring. The monitoring system includes a dual channel camera unit, a passive transmitter unit, and a receiver unit interposed between the transmitter unit and the remotely located camera unit. The transmitter provides control signals to a video control circuit in the receiver unit which controls the positioning of the camera unit as well as the camera lens functions. The dual channel camera unit is mounted on a pan-tilt unit; and includes a day-light camera, a low-light camera, a light intensifier for the low-light camera, and a channel control circuit. The channel control circuit provides for automatic channel switching in response to light intensity variations. This circuit also provides automatic control of the light intensifier during low-light operation.

28 Claims, 8 Drawing Figures

TELEVISION MONITORING SYSTEM

BACKGROUND OF THE INVENTION

The present invention relates to a remote controlled closed circuit television monitoring system, and in particular to a monitoring system that is adapted to low-light level operation.

A major problem with previous monitoring systems of this type concerns the life of the light intensifier, which is used to enhance or increase the light received at the camera lens during night operation. Due to the sophisticated technology involved, the cost of the light intensifier constitutes a significant portion of the total cost of the system. In many monitoring systems, a single camera is employed and the light intensifier is permanently affixed or glued to the face of the camera. Thus, the intensifier will be utilized any time the camera is operational, day or night. It is also apparent that when the intensifier needs to be replaced, the television camera must also be replaced. In other single camera systems where the intensifier is not directly attached, a motorized mirror or other similar devices must be employed in order to remove the intensifier from the path between the lens and camera for day operation.

Another factor affecting the life of the intensifier is the amount of light entering the intensifier. An overload situation may occur if the ambient light intensity is beyond an acceptable limit for the light intensifier. This situation has been controlled previously with neutral density filters and lens iris control, or with manual intensifier gain control.

Regarding the transmission of control signals to the television camera, an inherent shortcoming in previous systems concerns the distance range available between the transmitter unit and receiver unit. In many systems, a power supply is contained in the transmitter unit, and a separate wire is supplied for each control signal to be transmitted to the receiver. Due to the number and gauge of the wires involved and the sensitivity of the relays in the receiver unit, the distance between the transmitter and receiver is quite limited. This result is counter to the purposes of a remote controlled television monitoring system.

SUMMARY OF THE INVENTION

The present invention provides a novel television monitoring system, and includes a dual channel camera unit, a passive transmitter unit, and a receiver unit. Particularly, the monitoring system of the present invention features a dual channel camera unit having a day-light camera, a low-light camera, a light intensifier for the low-light camera, and a channel control circuit. The novel channel control circuit provides for automatic camera channel switching in response to a variation in the light intensity, and a time delay to allow the inactive channel to stabilize before switching video control. This circuit further provides automatic overload control of the light intensifier during night operation.

In addition, the monitoring system of the present invention provides a low voltage passive transmitter unit. Further, a video control circuit in the receiver allows two control signals to be applied separately on a single wire from the transmitter to the receiver.

Other objects, features and advantages of the present invention will become apparent from the subsequent description and examples, and the appended claims taken in conjunction with the accompanying drawings.

DETAILED DESCRIPTION OF THE PREFERRED EMBODIMENT

Figure 1:
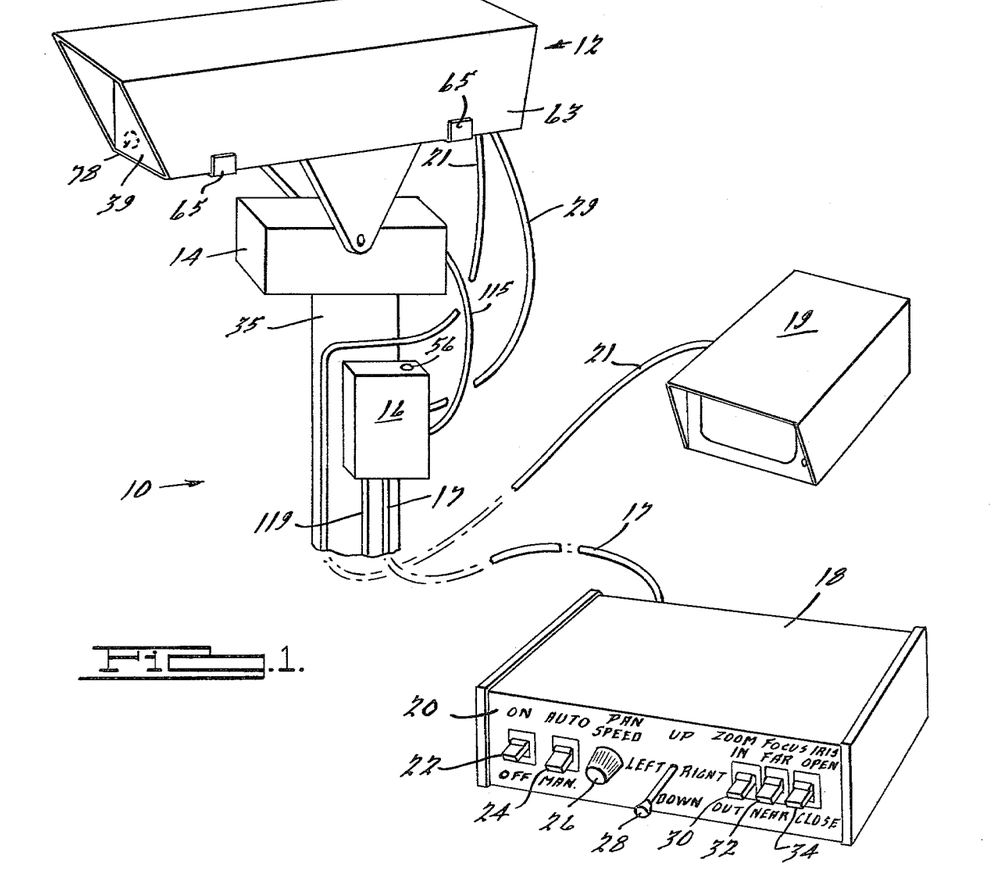
FIG. 1 is a perspective view of the monitoring system according to the present invention, including the camera unit, the pan-tilt unit, the receiver unit, the passive transmitter unit, and the monitor unit.

Referring to FIG. 1, a perspective view of a television monitoring system 10 according to the present invention is shown. The monitoring system is generally comprised of a dual channel camera unit 12, a pan-tilt unit 14, a receiver unit 16, a passive transmitter unit 18, and a television monitor unit 19. The camera unit is mounted on the pan-tilt unit, allowing for the controlled positioning of the camera unit in the horizontal and vertical directions. The operation of the system is controlled from the passive transmitter. Control signals are sent from the passive transmitter, through cable 17, to the receiver. The signals are then processed through the various video control circuits in the receiver, and sent to the camera and pan-tilt units. As indicated by the break in cable 17, the passive transmitter is typically located remote from the receiver. According to the present invention, the passive transmitter may be located up to 30,000 feet from the receiver, using number 22 wire for the wires contained in cable 17. The transmitter unit 18 is referred to as "passive" because the transmitter does not contain a separate power supply. The electrical power required by the transmitter is provided by a power supply contained in the receiver. This power supply also provides the electrical power needed to operate the camera unit.

The video output signal from the camera unit 12 is transmitted by cable 21 to the remote television monitor 19. Typically, the monitor 19 and transmitter 18 are located in the same place so that the person viewing the picture on the monitor screen can also operate the transmitter and thus move or adjust the camera unit 12. Preferably a 10 inch or 12 inch monitor unit manufactured by Audio Tronics, Inc., Minneapolis, Minnesota is used for the monitor 19, but any equivalent or other conventional unit can be utilized.

The front face 20 of the passive transmitter contains a number of operational or video controls. The on/off switch 22 is used to provide electrical power to camera unit 12. This switch as well as the remaining four switches are three position lever switch (nonlocking on both sides). The auto/manual switch 24, pan speed potentiometer 26, and joystick 28 control the operation of the pan-tilt unit 14. In the automatic mode, the pan-tilt unit sweeps or pans the camera unit horizontally left and right within the boundaries determined by the adjustable limit switches contained in the pan-tilt unit. In the manual mode, the camera unit is ordinarily stationary. However, the position of the camera unit may be altered in the vertical or horizontal direction under the control of joystick 28. The joystick is generally comprised of a two position switch for each direction of movement (left, right, up, down), and is standard in the art. Pan speed potentiometer 26 is used to vary the speed of the camera unit in the horizontal direction from 0.0 to 8.0 degress per second. Zoom switch 30, focus switch 32, and iris switch 34 are used to control the operation of the monitorized lens in the camera unit. Pan-tilt unit 14 is of a standard type manufactured by Quick-Set, Inc., Northbrook, Ill. It is capable of panning from 0 to 340 degrees horizontally, and tilting from 45 degrees above to 45 degrees below horizontal. The pan-tilt unit may be mounted on any suitable structure which will permit the desired camera unit scanning range, such as pole 35.

Figure 2:
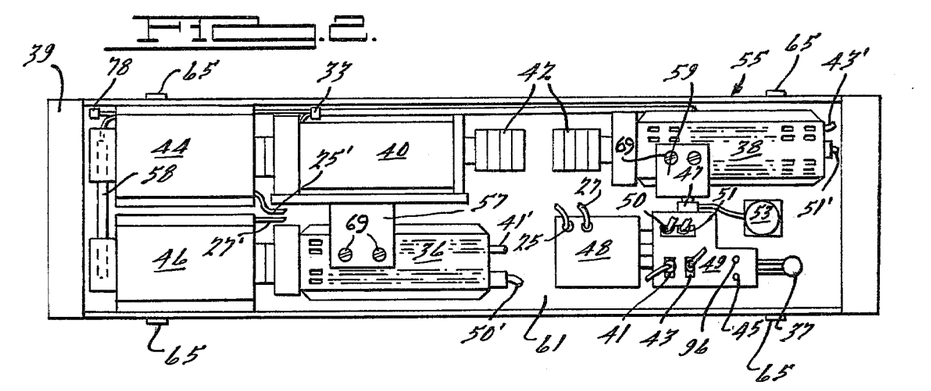
FIG. 2 is a top elevation view of the dual channel camera unit.

Referring to FIG. 2, a top elevation view of dual channel camera unit 12 is shown. The camera unit includes two separate television cameras, a day-light camera 36 and a low-light camera 38. Both cameras are manufactured by Panasonic, with the day-light camera identified as model No. 1100A and the low-light camera identified as Model 1000A. Each camera provides a separate video channel, generally designated as a day channel (day-light camera 36) and a night channel (low-light camera 38). The day channel is used when the ambient light intensity on faceplate 39 is between 10,000 foot candles (full sunlight) and 1.0 foot candle (daybreak). When the ambient light is reduced to approximately 1.0 foot candles (dusk) the night channel will be utilized. The night channel will typically be operated over a range in light intensity from 1.0 foot candles to 0.00001 foot candles (overcast night).

In addition to low-light camera 38, the night channel also includes light intensifier 40, relay lenses 42, and motorized lens 44. The light intensifier is manufactured by Varo Electron Devices, Inc., Garland, Tex. and is characterized as a 25mm image intensifier with a 180k gain. The light intensifier 40 is used to enhance or increase the light received at lens 44. The motorized lens 44 is manufactured by Vicon, Inc., New York, N.Y. It is characterized as an 18–144mm zoom lens on a 1" format with minimum f/stop of 2.0 giving a 25–200mm zoom range on a ⅜" format. The relay lenses 42 comprise two conventional 50mm lenses (f 1.4) and are spaced apart slightly as shown.

The day channel is comprised of day-light camera 36 and motorized lens 46, and is mounted substantially parallel to the night channel components. Motorized lens 46 is identical to motorized lens 44 in the night channel. It should be appreciated that this separation of the day and night channels not only increases the life of the intensifier, but also provides crisper day channel pictures. This is due to the elimination of the light intensifier and relay lens from the day channel.

Circuit board 48 contains the channel control circuit 54 (which is described in more detail with reference to FIGS. 3 and 4). As indicated from the front face 20 of transmitter 18, there is no provision for manually switching the camera channels. This function is performed automatically by the channel control circuit 54. The circuit board 48 is connected (via a conventional edge connector) to a "connector" circuit board 49. The connector board 49 brings the video and electrical signals into the circuit board 48 and also relays the video output signal to the monitor 19. Jacks/sockets 50 and 51 are used to connect the video signal cables 50' and 51' from the two television cameras 36 and 38 with circuit board 49 and in turn with the control circuit 54. Plugs/sockets 41 and 43 are used to connect the electrical power via cables 41' and 43' to the two cameras 36 and 38. Jack-socket 45 is used to connect the video output signal from the camera 12 (via circuit board 49) through cable 21 to the external viewing monitor 19. The connector board 49 also has a terminal block 47 on one edge which connects the circuit boards 48 and 49 to receiver 16 via socket 37 and cable 29.

The light intensifier 40 is connected as by plug 33 and appropriate wiring to the connector board 49 through terminal 47. Motorized lenses 44 and 46 are connected to circuit board 48 by jacks/sockets 25 and 27 cables 25' and 27'.

The camera unit 12 also contains a thermostatically controlled 100 watt resistive-ceramic type heater 58 (mounted in the front of camera unit 12 under the motorized lenses 44 and 46), and a 115 VAC fan 53 which provides continuous air circulation whenever power is supplied to the camera unit. The heater is controlled by thermostat 96 and is adapted to be automatically switch on at 55° F. and switched off at 65° F. The heater 58 and fan 53 are connected to circuit board 49 through terminal block 47.

All of the heretofore mentioned devices contained in the camera unit 12 are modularly mounted in housing 55. The low-light camera 38 is attached to one of the relay lenses 42 as one unit and the light intensifier 40, motorized lens 44 and other relay lens are also attached together as a second unit, and each of these units can be taken out and replaced as a unit, or the separate items can be detached in the camera 12 and replaced individually. Brackets 57 and 59 are attached to the bottom 61 of the housing 55 and hold the low-light camera units in place. The light intensifier 40 is attached (as by screws) to upright portion of bracket 57, while bracket 59 is adapted to side over camera 38 and secure it in place by means of two screws 69. The screws 69 are made of a plastic material, such as Delrin, to eliminate ground loops which would cause a noisy video signal. Similarly, the day-light camera 36 and motorized lens 46 are attached together as a unit or individually. The overhanging portion of bracket 57 is attached also by plastic screws 69 to camera 36 and secures this latter two-component unit in place. This modular mounting arrangement, as well as the plug/socket and jack/socket connections means that all of the components may be readily removed and replaced without taking down the camera unit 12 itself.

Housing 55 also provides a weather-tight seal which resists the entry of moisture into the unit. A cover member 63 is adapted to fit over the bottom member 61 and is held tightly in place by conventional fasteners 65.

Figure 3:
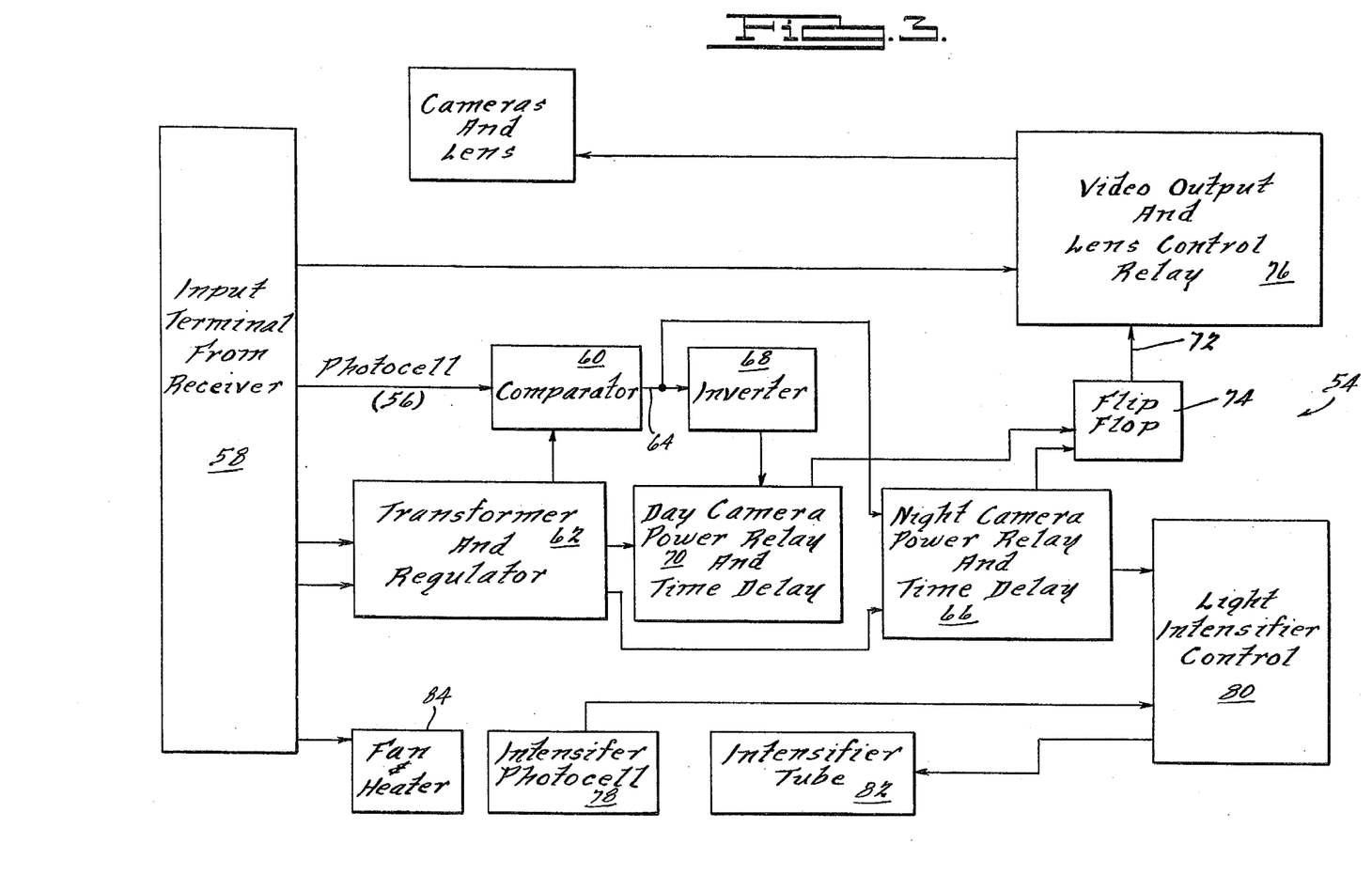
FIG. 3 is a block diagram of the channel control circuit contained in the camera unit.

Referring to FIG. 3, a block diagram of channel control circuit 54 is shown. This circuit performs two basic functions, channel switching control and light intensifier control. As stated previously, the switching from one channel to another occurs automatically. This switching is based on a variation in the ambient light intensity, as sensed by photocell 56 mounted on receiver unit 16 (best shown in FIG. 5).

The signal from photocell 56, as with the other signals sent from the receiver to the camera unit, enter at input terminal 58. The voltage signal from the photocell is compared via comparator 60 with a reference voltage supplied by transformer and regulator 62. The reference voltage is selected so that the comparator 60 will generate a high output voltage at dusk and a low output voltage at daybreak, on line 64. The output from the comparator 60 is connected on two relay and timing circuits. Line 64 is directly connected to the low-light camera power relay and time delay circuit 66, and indirectly connected through invertor 68 to day-light camera power relay and time delay circuit 70. Circuits 66 and 70 are used to turn off and on the electrical power to the two cameras. Thus, when the output of the comparator switches high at dusk, a relay in circuit 66 will be actuated, and power will be supplied to the low-light camera. Similarly, inverter 68 will generate a low output to circuit 70 when the comparator output is high, and de-energize the day-light camera by actuating a relay in the reverse direction. However, these two responses to the comparator output do not occur simultaneously. In both circuits 66 and 70, a time delay capacitor is provided to allow the camera being energized to warm up or stabilize before the camera is de-energized. Thus, in the situation above the day-light camera would remain on for approximately 60 seconds after the low-light camera was turned on. When the day-light camera is turned off, the actuation of the relay in circuit 70 will set the output, line 72, of flip flop 74. This will activate a relay in circuit 76 to transfer the motorized lens power and control, as well as video output of the camera unit, to the new channel. In the situation above, the video output would be that of the night channel, and motorized lens 44 would be operational. It should be appreciated that as daybreak occurs, the day channel will be supplied with power and control in the same manner as described for the night channel.

The second function of channel control circuit 54 is to control the gain of the light intensifier during night channel operation. This control is based upon photocell 78. This photocell is mounted near the inside surface of face plate 39 of the camera unit 12. The voltage signal from the photocell 78 is connected to light intensifier control circuit 80. This circuit is used to vary the voltage sent to the light intensifier control 82 and thereby control the gain. This intensifier control 82 also acts to provide automatic overload protection of the intensifier. Thus as the ambient light increases with the approach of daybreak, or a high intensity of light impinges on the intensifier, the light will not overload the intensifier as is possible with manual control.

Figure 4:
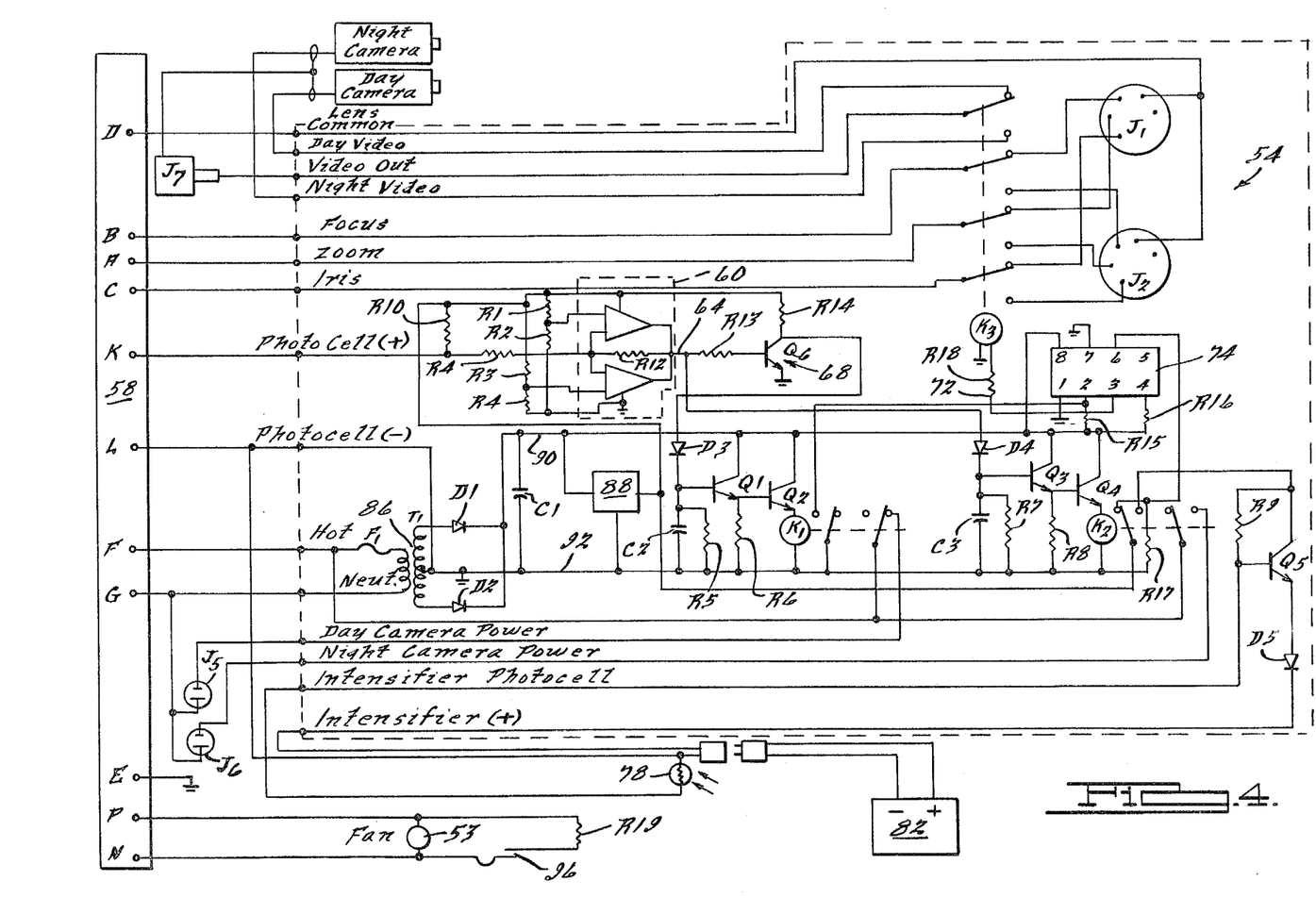
FIG. 4 is a circuit diagram of the channel control circuit contained in the camera unit.

Referring to FIG. 4, a circuit diagram of the channel control circuit in FIG. 3 is shown. Transformer and regulator block 62 is now shown to be comprised of step down transformer 86 and regulator 88. Transformer 86 provides two 7.5 VAC secondary outputs, and along with diodes D1 and D2 and capacitor C1, an approximate 12 VDC voltage is supplied across lines 90 and 92. Regulator 88 is a National Semiconductor LM340T regulator, and it supplies an 8 VDC output voltage. This output is connected to two voltage dividers $R_1R_2$ and $R_3R_4$. These resistors set an upper and lower "trip" point for comparator 60, an LM339 IC manufactured by National Semiconductor. Capacitor C2 provides the time delay in day-light camera power relay and time delay circuit 70, and capacitor C3 provides the time delay for circuit 66. Relay K1 is the power relay for the day-light camera, and relay K2 is the power relay for the low-light camera. each relay has two sets of contacts, the first being used to set or reset flip flop 74 and the second being used to energize or de-energize the cameras. Flip flop 74 is an LM555 Timer manufactured by National Semiconductor. The output of the flip flop, line 72, is connected to relay K3. Relay K3 is used to transfer the lens power and control, as well as the video signal output from the camera unit. Jacks J1 and j2 are used to connect motorized lens 44 and 46 to relay K3.

During the day, relay K1 is energized through capacitor C2, and transistors Q1 and Q2. As dusk approaches, comparator 60 switches to a high output state which charges capacitor C3 and energizes relay K2 through transistors Q3 and Q4. At the same time, inverter transistor Q6 is turned on which takes its collector terminal to ground. This causes capacitor C2 to start discharging. Relay K1 will remain energized until capacitor C2 is discharged. During this time, both relays K1 and K2 are energized, through K3 is still in the de-energized state. The time during which capacitor C2 is discharging is the time allowed for the low-light camera to warm up. When capacitor C2 finally discharges, relay K1 de-energizes, setting flip flop 74 and energizing relay K3. The night channel would now be totally operative. As may be appreciated by one skilled in the art, the method of switching from the night channel to the day channel is similar to that described above.

Transistor Q5 supplies the power to the light intensifier (block 82) during night channel operation. Transistor Q5 is turned on when relay K2 is energized. Photocell 78 regulates the voltage supplied to the intensifier by varying the base current to transistor Q5. The environmental control is provided by fan 53 and heater/resistor R19 Thermostat 96 controls the operation of heater/resistor R3.

Figure 5:
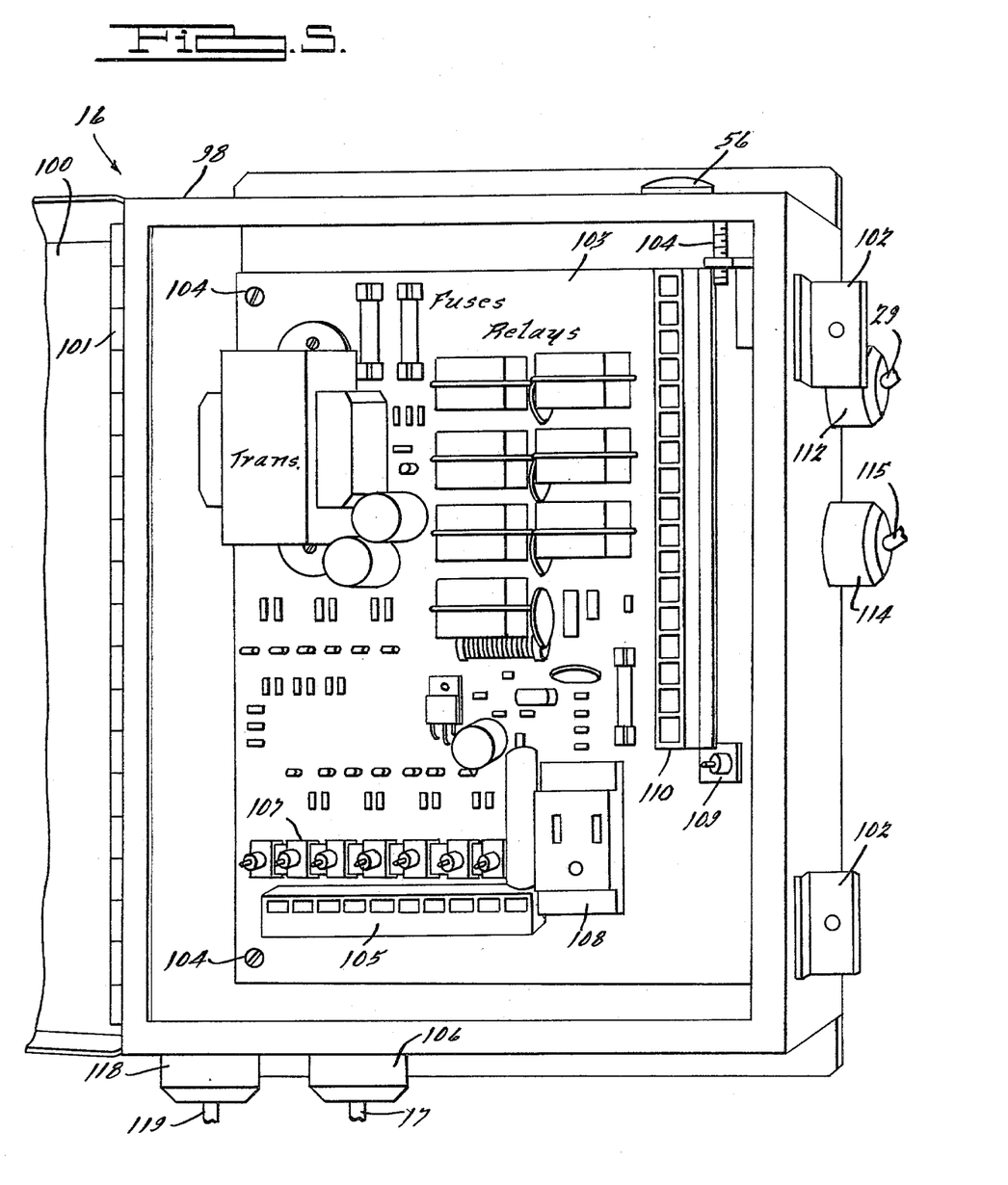
FIG. 5 is a perspective view of the receiver unit.

Referring to FIG. 5, a perspective view of receiver unit 16 is shown. The receiver unit is enclosed in a weather-tight housing 98. Access to the receiver unit is provided by front panel 100, which is secured by hinge 101 on one side and a suitable locking mechanism (partially shown at 102) on the other side. The receiver circuit board 103 is secured to housing 98 at each corner by screws 104. Power is supplied to the receiver through connector 118 and cable 119.

Input terminal 105 is used to receive the 10 wires contained in cable 17 (shown in FIG. 1) connecting passive transmitter unit 18 with receiver unit 16. Connector 106 provides cable 17 with access to the receiver unit. Seven switches, generally designated at 107, are used for servicing the transmitter and receiver units. These switches are functionally identical to the switches contained in the passive transmitter, and include the zoom, focus, iris, on/off, auto/manual, left/right, and up/down functions. Thus, during servicing the monitoring may be operated from the receiver unit. Auxilarly socket 108 may also be used during servicing, and is directly connected to the 115 VAC supply which powers the monitoring system. Switch 109 is also intended to be used during servicing, and acts to cut off the power to the monitoring system. Output terminal 110 is used to transmit the video control signals to the camera unit 12 (through connector 112 and cable 29) and pan-tilt unit 14 (through connector 114 and cable 115).

Figure 6:
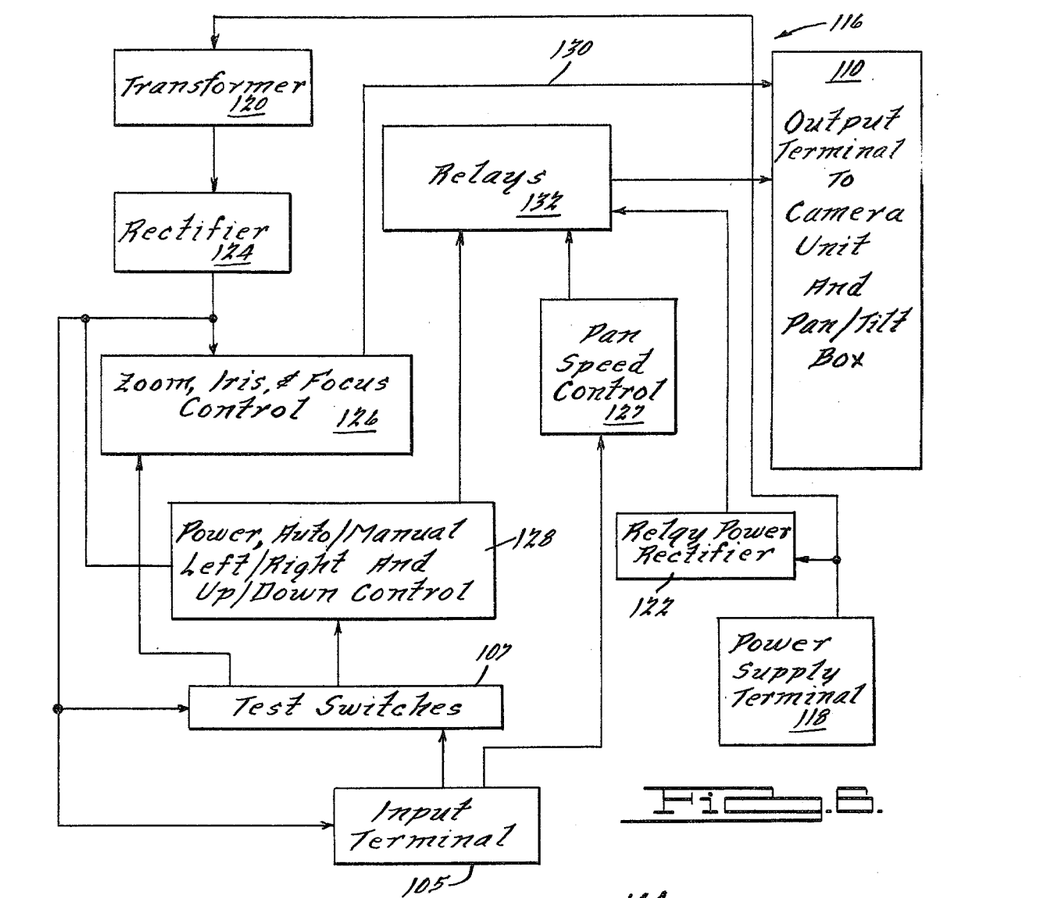
FIG. 6 is a block diagram of the receiver circuit shown in FIG. 5.

Referring to FIG. 6, a block diagram of receiver circuit 116 is shown. The output of power supply terminal 118 is connected to step down transformer 120 and relay power rectifier 122. The transformer secondary is connected to rectifier 124. The output of rectifier 124 provides an approximate 24 VDC voltage (±12 VDC) to input terminal 105, test switches 107, control circuit 126, pan speed control circuit 127, and control circuit 128. Thus, the output of this rectifier provides the power necessary to operate passive transmitter unit 18. It may be observed that the output of lens control circuit 126, indicated at line 130, is directly connected to output terminal 110, whereas, the output of control circuit 128 and pan speed control circuit 127 are connected through a plurality of relays 132 to output terminal 110.

Figure 7:
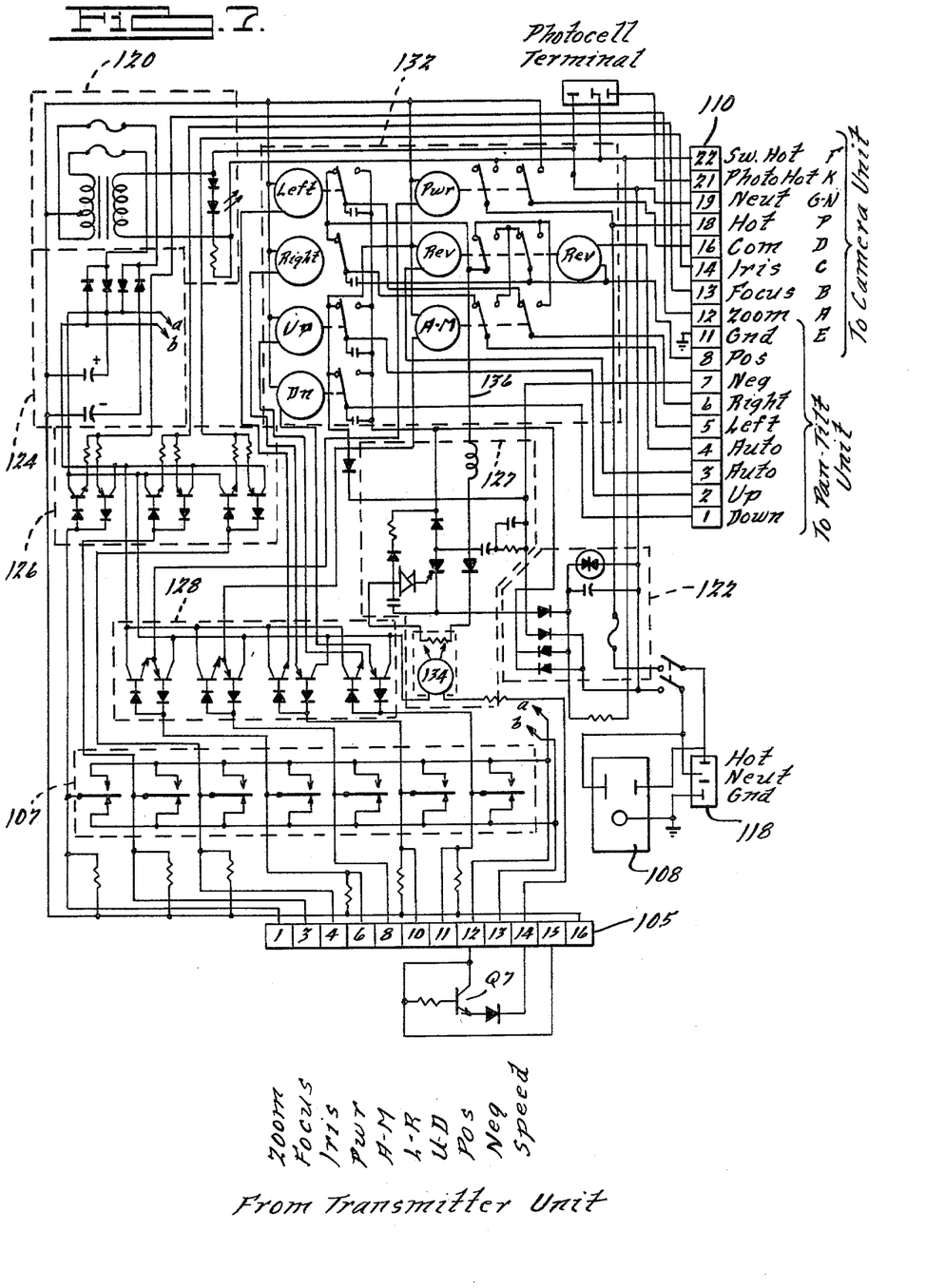
FIG. 7 is a circuit diagram of the receiver circuit shown in FIG. 5.

Referring to FIG. 7, a circuit diagram of the receiver circuit in FIG. 6 is shown. It should be noted that the wiring for the test switches 107 and input terminal 105 is essentially a duplicate of the internal wiring of the passive transmitter unit. The passive transmitter speed potentiometer is optically coupled to the pan speed control circuit 127 through photomodulator 134. The potentiometer varies the amount of light generated by 134, which in turn varies the positive voltage on line 136. This line 136 is connected through relays 132 to output terminal 110. As indicated in FIG. 7, control circuits 126 and 128 are not only similar, but the components in these circuits and their arrangement are identical. The repetitive segment in these circuits, referred to hereinafter as a video control circuit, will now be described.

Figure 8:
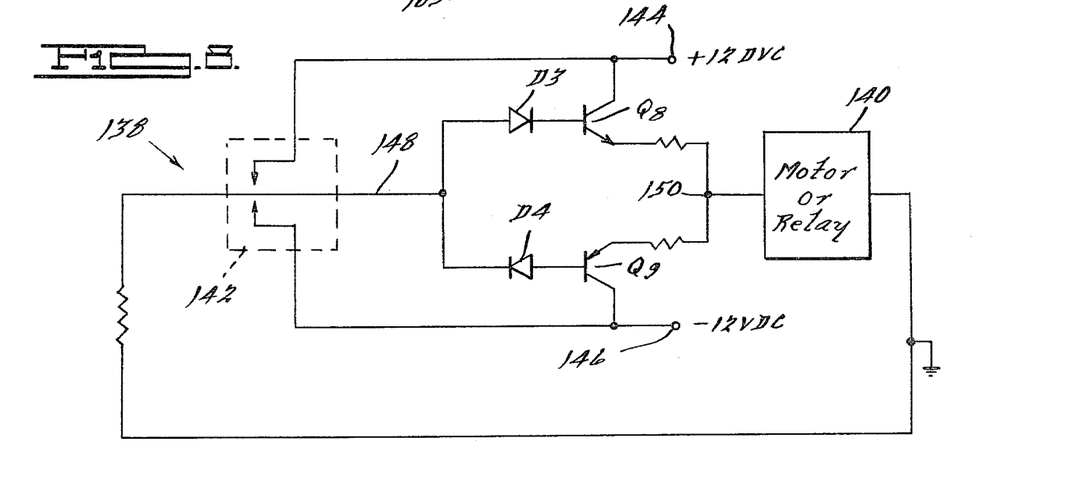
FIG. 8 is a circuit diagram of a video control circuit which comprises a portion of the receiver circuit.

Referring to FIG. 8, a circuit diagram of a video control circuit 138 is shown. The function of this circuit is to selectively apply a positive or negative control voltage to a motor or relay (block 140). Switch 142 may either be one of the test switches 107 contained in the receiver unit, or one of the switches contained in the passive transmitter unit. The output of rectifier 124 provides a positive control voltage at node 144, and a negative control voltage at node 146. When switch 142 is in the center or neutral position, the voltage on line 148 will be approximately that of the ground potential. However, when the switch position is changed so that a positive voltage is applied to line 148, transistor Q8 will be switched on through diode D3. At this time, diode D4 will block current flow, and leave transistor Q9 in an off state. Thus, the positive voltage at node 150 will energize a relay or conduct current through the motor. Similarly, when a negative voltage is applied to line 148, transistor Q9 will be switched on, and thereby energizing the relay or passing current through the motor in the reverse direction. One of the significant features of video control circuit 138 is that it permits two control signals to be applied on a single wire. This feature is important in allowing the transmitter unit to be located at a remote distance from the area being monitored by the camera unit.

While it is apparent that the preferred embodiments illustrated and discussed herein are well calculated to fulfill the objectives above stated, it will be appreciated that the present invention is susceptible to modification, variation, and change without departing from the scope of the invention, as defined by the following claims.

What is claimed is:

1. A camera unit for a television monitoring system, comprising:
    a first camera, for monitoring principally during daylight conditions;
    a second camera, for monitoring principally during low-light conditions;
    a light intensifier in association with said second camera for intensifying the light received by said second camera; and
    control circuit means for selectively energizing, utilizing, and de-energizing either said first camera or said second camera and said light intensifier in response to a predetermined variation in ambient light intensity, so that a time delay is provided between said energizing and said utilizing of said cameras and said light intensifier.

2. The camera unit according to claim 1, wherein said control circuit means further includes a light intensifier control means for adjusting the gain of said light intensifier in response to a variation in the ambient light intensity.

3. The camera unit according to claim 1, further including mounting means for mounting said first camera substantially parallel to said second camera.

4. The camera unit according to claim 1, further including a motorized lens for each of said cameras, said motorized lens being selectively energized and de-energized by said control circuit means.

5. The camera unit according to claim 1, further including at least one relay lens, and said relay lens directly couples said light intensifier with said second camera.

6. The camera unit according to claim 5, further including a housing for containing said cameras, said light intensifier, said control circuit means, and said relay lens; and for sealing against the entry of moisture.

7. The camera unit according to claim 6, further including a heater and fan, mounted in said housing, and controlled by a thermostat for permitting all weather operation of said camera unit.

8. A method for switching channels in a television monitoring system camera unit, including a first camera for providing a first channel video signal, a second camera for providing a second channel video signal, a motorized lens for each of said cameras, a light intensifier cooperative with one of said cameras, and a control circuit means, comprising the steps of:
    (a) sensing the ambient light intensity;
    (b) energizing said first camera in response to a predetermined level of said light intensity; and
    (c) after a predetermined delay, de-energizing said second camera and concomitantly transferring from said second channel to said first channel.

9. The method according to claim 8, including the steps of utilizing said first camera for monitoring principally during day-light conditions, and utilizing said second camera for monitoring principally during low-light conditions.

10. The method according to claim 9, including the step of de-energizing said light intensifier concomitantly with said second camera.

11. The method according to claim 8, including the steps of utilizing said first camera for monitoring principally during low-light conditions, and utilizing said second camera for monitoring principally during day-light conditions.

12. The method according to claim 11, including the step of energizing said light intensifier concomitantly with said first camera.

13. The method according to claim 8, including the step of transferring control from said motorized lens for said second camera to said motorized lens for said first camera, concomitantly with said de-energizing of said second camera.

14. For a remote control apparatus in a television monitoring system having a transmitter unit for providing control signals, a camera unit for providing a video signal, a receiver unit in association with said transmitter unit and said camera unit, and at least one actuator for controlling said camera unit in response to said control signals, the improvement comprising:
- a source of d.c. voltage electrical power for said transmitter unit, contained in said receiver unit, and connected to said transmitter unit via a pair of conductors;
- a single conductor for transmitting two of said control signals from said transmitter unit to said receiver unit; and
- a video control circuit means, contained in said receiver unit, for selectively utilizing said two control signals, transmitted alternatively on said single conductor, to energize said actuator.

15. The remote control apparatus according to claim 14, wherein said two control signals are generated from said d.c. voltage electrical power.

16. The remote control apparatus according to claim 15, wherein said d.c. voltage electrical power provides a positive voltage on one of said conductors and a negative voltage on the other of said conductors.

17. The remote control apparatus according to claim 14, wherein said video control circuit means comprises:
- a first switching means for transmitting a positive voltage to energize said actuator in one direction;
- a second switching means for transmitting a negative voltage to energize said actuator in the reverse direction; and
- a selective blocking means for alternatively gating on and off said first and second switching means in response to a control signal from said transmitter unit.

18. The remote control apparatus according to claim 17, wherein said actuator is an electric motor.

19. The remote control apparatus according to claim 17, wherein said actuator is a relay.

20. The remote control apparatus according to claim 17, wherein said first and second switching means are transistors.

21. The remote control apparatus according to claim 20, wherein said selective blocking means comprises a diode connected to a base terminal of each of said first and second switching transistors.

22. A camera unit for a television monitoring system, comprising:
- a first camera, for monitoring principally during daylight conditions;
- a second camera, for monitoring principally during low-light conditions;
- a light intensifier in association with said second camera for intensifying the light received by said second camera; and
- control circuit means for selectively energizing, utilizing, and de-energizing either said first camera or said second camera and said light intensifier to provide a video signal from said camera unit, and for adjusting the gain of said light intensifier in response to a variation in the ambient light intensity when said second camera and said light intensifier are utilized.

23. The camera unit according to claim 22, wherein said control circuit means includes a photocell for sensing the ambient light intensity and a transistor coupled to said photocell for regulating the voltage supplied to said light intensifier.

24. For a remote control apparatus in a television monitoring system having a transmitter unit for providing control signals, a camera unit for providing a video signal, a receiver unit in association with said transmitter unit and said camera unit, and a plurality of actuators for controlling said camera unit in response to said control signals, the improvement comprising:
- a source of electrical power for said transmitter unit, contained in said receiver unit, and connected to said transmitter unit via a pair of conductors;
- a single conductor for each of said plurality of actuators for transmitting at least two control signals from said transmitter unit to said receiver unit; and
- video control circuit means for each of said plurality of actuators, contained in said receiver unit, for selectively utilizing said two control signals, transmitted alternatively on said single conductor, to energize one of said actuators.

25. The remote control apparatus according to claim 24, wherein said source of electrical power provides a d.c. low voltage signal on said pair of conductors, such that one of said conductors provides a positive voltage and the other of said conductors provides a negative voltage.

26. The remote control apparatus according to claim 25, wherein said transmitter unit includes a switch for each of said plurality of actuators for generating said two control signals from said positive and negative voltage signals.

27. The remote control apparatus according to claim 26, wherein said switches are connected electrically in parallel to said positive and negative voltage signals.

28. The remote control apparatus according to claim 27, wherein said switches comprise three-position switches.

* * * * *

UNITED STATES PATENT AND TRADEMARK OFFICE
CERTIFICATE OF CORRECTION

PATENT NO. : 4,293,876
DATED : October 6, 1981
INVENTOR(S) : Jarvis L. Williams

It is certified that error appears in the above—identified patent and that said Letters Patent is hereby corrected as shown below:

| | |
|---|---|
| Column 5, Line 22 | -insert "other" after --the-- |
| Column 5, Line 47 | -insert "source" after --intensity-- |
| Column 5, Line 67 | -"each" should be --Each-- |
| Column 6, Line 7 | -"j2" should be --J2-- |
| Column 6, Line 18 | "through" should be --though-- |
| Column 6, Line 55 | -"Auxilarly" should be --Auxiliary-- |

Signed and Sealed this

Thirtieth Day of March 1982

[SEAL]

Attest:

Attesting Officer

GERALD J. MOSSINGHOFF
Commissioner of Patents and Trademarks